(12) United States Patent
Nenseth et al.

(10) Patent No.: US 8,445,598 B2
(45) Date of Patent: May 21, 2013

(54) HETEROPHASIC POLYPROPYLENE WITH HIGH FLOWABILITY AND EXCELLENT LOW TEMPERATURE IMPACT PROPERTIES

(75) Inventors: Svein Nenseth, Skien (NO); Petar Doshev, Linz (AT)

(73) Assignee: Borealis Technology Oy, Porvoo (FI)

( * ) Notice: Subject to any disclaimer, the term of this patent is extended or adjusted under 35 U.S.C. 154(b) by 236 days.

(21) Appl. No.: 12/808,341

(22) PCT Filed: Oct. 28, 2008

(86) PCT No.: PCT/EP2008/009100
§ 371 (c)(1),
(2), (4) Date: Jun. 15, 2010

(87) PCT Pub. No.: WO2009/077032
PCT Pub. Date: Jun. 25, 2009

(65) Prior Publication Data
US 2010/0280181 A1  Nov. 4, 2010

(30) Foreign Application Priority Data
Dec. 17, 2007  (EP) ..................... 07024422

(51) Int. Cl.
*C08L 23/10* (2006.01)
*C08L 23/16* (2006.01)
(52) U.S. Cl.
USPC .......................................... 525/240; 525/191
(58) Field of Classification Search
USPC ...................................................... 525/240
See application file for complete search history.

(56) References Cited

U.S. PATENT DOCUMENTS 6,342,566 B2 * 1/2002 Burkhardt et al. ............ 525/191

FOREIGN PATENT DOCUMENTS

| EP | 0 790 262 A1 | 8/1997 |
| EP | 0 887 379 A1 | 12/1998 |
| EP | 1 354 901 A1 | 10/2003 |
| EP | 1 659 151 A1 | 5/2006 |
| EP | 1 829 903 A1 | 9/2007 |
| WO | 92/12182 A1 | 7/1992 |
| WO | 94/28034 A1 | 12/1994 |
| WO | 01/48034 A2 | 7/2001 |
| WO | 01/58970 A1 | 8/2001 |
| WO | 03/051934 A2 | 6/2003 |
| WO | 2005/104940 A2 | 11/2005 |

OTHER PUBLICATIONS

Randall, J.C., "A Review of High Resolution Liquid 13Carbon Nuclear Magnetic Resonance Characterizations of Ethylene-Based Polymers", Macromol Chem Phys C29(2 & 3) (1989), pp. 201-231.
Randall, J.C., "A Review of High Resolution Liquid 13Carbon Nuclear Magnetic Resonance Characterizations of Ethylene-Based Polymers", Macromol Chem Phys C29(2 & 3) (1989), pp. 232-262.
Randall, J.C., "A Review of High Resolution Liquid 13Carbon Nuclear Magnetic Resonance Characterizations of Ethylene-Based Polymers", Macromol Chem Phys C29(2 & 3) (1989), pp. 263-293.
Randall, J.C., "A Review of High Resolution Liquid 13Carbon Nuclear Magnetic Resonance Characterizations of Ethylene-Based Polymers", Macromol Chem Phys C29(2 & 3) (1989), pp. 294-317.

* cited by examiner

*Primary Examiner* — Roberto Rabago
(74) *Attorney, Agent, or Firm* — Roberts Mlotkowski Safran & Cole, P.C.

(57) ABSTRACT

The present invention relates to a heterophasic polypropylene resin comprising a propylene homo- or copolymer matrix (A) and an ethylene-propylene rubber phase (B) dispersed within the matrix, wherein the heterophasic polypropylene resin has a fraction insoluble in p-xylene at 25° C. (XCU) with an intrinsic viscosity of 1.5 dl/g or less, determined according to DIN EN ISO 1628-1 and -3 and an amount of propylene monomer units of at least 95 mol %, and a fraction soluble in p-xylene at 25° C. (XCS) with an intrinsic viscosity of 1.5 to 3.0 dl/g, determined according to DIN EN ISO 1628-1 and -3, and an amount of propylene monomer units of 50 to 75 mol %, and a MFR (2.16 kg, 230° C.) of more than 100 g/10 min, determined according to ISO 1133, a heterophasic polypropylene composition comprising such a resin, a process for preparing that resin, and an article made thereof.

15 Claims, No Drawings

HETEROPHASIC POLYPROPYLENE WITH HIGH FLOWABILITY AND EXCELLENT LOW TEMPERATURE IMPACT PROPERTIES

The present invention relates to a heterophasic polypropylene resin comprising a propylene homo- or copolymer matrix and an ethylene-propylene rubber phase dispersed within the matrix with a high flowability and excellent low temperature impact properties. Further, it relates to a process for producing such a polypropylene resin and the use of such a resin for the production of an article.

Well-known polypropylenes of commerce are particularly isotactic, semi-crystalline, thermoplastic polymer materials. One of the main application areas of polypropylene is to be found in injection molding of thin-wall articles. Typical examples include plastics cups, pales and small containers mainly intended for food packaging. In order to be suitable for thin-wall injection molding application, the polypropylene should demonstrate excellent processability/flowability, normally expressed by high melt flow rate (MFR), i.e. low average molecular weight. However, those polypropylenes exhibit brittle behaviour under impact loading especially at low temperatures.

In order to improve the impact properties in EP 1 354 901 and EP 1 659 151 high amounts of impact modifiers like elastomeric ethylene-propylene copolymers are added to high flowable polypropylenes however having adverse effect on flowability and processability in general.

In EP 0 790 262 low amounts (~10 wt. %) of impact modifier were combined with the beneficial effect of β-crystal nucleation on the toughness. However, β-crystal nucleation results in very hazy material and the resulting materials are consequently not suitable for applications requiring transparency.

Considering the above disadvantages it is object of the present invention to provide an unmodified polypropylene composition that shows a high flowability together with excellent impact properties especially at low temperature.

The present invention is based on the finding that the above object can be achieved if a propylene homo- or copolymer with a very low intrinsic viscosity as a matrix phase is combined with a dispersed phase comprising an ethylene-propylene rubber with a high amount of propylene monomer units. The resulting heterophasic propylene resin has high flowability together with excellent impact properties.

Hence, the present invention provides a heterophasic polypropylene resin comprising
a propylene homo- or copolymer matrix (A) and an ethylene-propylene rubber phase (B) dispersed within the matrix, wherein the heterophasic polypropylene resin has
a fraction insoluble in p-xylene at 25° C. (XCU) with an intrinsic viscosity of 1.5 dl/g or less, determined according to DIN EN ISO 1628-1 and -3, and an amount of propylene monomer units of at least 95 mol % and
a fraction soluble in p-xylene at 25° C. (XCS) with an intrinsic viscosity of 1.5 to 3.0 dl/g, determined according to DIN EN ISO 1628-1 and -3, and an amount of propylene monomer units of 50 to 75 mol %,
and a MFR (2.16 kg, 230° C.) of more than 100 g/10 min, determined according to ISO 1133.

It has surprisingly been found that a heterophasic polypropylene resin with these characteristics shows a high flowability, and at the same time improved impact properties especially at low temperatures.

The term "polypropylene" denotes a propylene homo- or copolymer or a mixture of such propylene homo- or copolymers.

Component (A) may consist of a single propylene homo- or copolymer, but (A) may also comprise a mixture of different propylene homo- or copolymers. This also applies for all preferred embodiments of component (A).

The same applies for component (B), i.e. they may consist of a single compound, but may also comprise a mixture of different compounds. This also applies for all preferred embodiments of component (B).

In a preferred embodiment, the resin consists of components (A) and (B).

The fraction insoluble in p-xylene at 25° C. (XCU) is meant to be the fraction of the polypropylene resin that is not soluble in p-xylene at 25° C. representing for the most part isotactic propylene homo- or copolymer. The fraction soluble in p-xylene (XCS) is denoted the fraction of the polypropylene resin that is soluble in p-xylene at 25° C. representing for the most part amorphous ethylene-propylene copolymer.

The XCU fraction of the present invention has an intrinsic viscosity of 1.5 dl/g or less, preferably 0.1 to 1.3 dl/g, more preferably 0.3 to 1.2 dl/g, still more preferably 0.5 to 1.1 dl/g, most preferably 0.6 to 1.0 dl/g, determined according to DIN EN ISO 1628-1 and -3.

The XCU fraction of the present invention has an amount of propylene monomer units of at least 95 mol %, more preferably at least 96 mol %, still more preferably at least 97 mol %, most preferably at least 98 mol %.

The amount of propylene monomer units in the XCU fraction is preferably determined by NMR measurement preferably further showing a statistical distribution of at least 50%, more preferably at least 60% of the ethylene monomer units in the XCU fraction.

It is further preferred that the XCU fraction has a weight average molecular weight $M_w$ of 50 to 200 kg/mol, more preferably 70 to 180 kg/mol, still more preferably 80 to 160 kg/mol, most preferably 90 to 140 kg/mol, and a number average molecular weight $M_n$ of 20 to 100 kg/mol, more preferably of 30 to 80 kg/mol, most preferably of 35 to 60 kg/mol, determined by GPC according to ISO 16014-1, and 4.

Preferably, the XCU fraction has a molecular weight distribution MWD of 1.5 to 5.0, more preferably 1.8 to 4.0, most preferably 2.0 to 3.5.

In a preferred embodiment the XCU fraction is present in an amount of 60 to 95 wt %, more preferably 70 to 90 wt %, still more preferably 75 to 88 wt %, most preferably 78 to 85 wt % of the heterophasic polypropylene resin.

The XCS fraction according to the invention has an amount of propylene monomer units of 50 to 75 mol %, preferably 55 to 70 mol %, most preferably 60 to 65 mol %.

Further, the XCS fraction of the present invention has an intrinsic viscosity of 1.5 to 3.0 dl/g, preferably 1.6 to 2.8 dl/g, more preferably 1.7 to 2.6 dl/g, still more preferably 1.8 to 2.4 dl/g, most preferably 1.9 to 2.2 dl/g, determined according to DIN EN ISO 1628-1 and -3.

It is preferred that the intrinsic viscosity of the XCS fraction is equal or higher than the intrinsic viscosity of the XCU fraction.

The amount of propylene monomer units in the XCS fraction is preferably determined by NMR measurement preferably further showing a statistical distribution of at least 50%, more preferably at least 60%, most preferably at least 65% of the ethylene monomer units in the XCS fraction.

It is further preferred that the XCS fraction has a weight average molecular weight $M_w$ of 80 to 300 kg/mol, more preferably 100 to 280 kg/mol, still more preferably 120 to 260 kg/mol, most preferably 200 to 250 kg/mol and a number average molecular weight $M_n$ of 50 to 130 kg/mol, more preferably of 60 to 110 kg/mol, most preferably of 70 to 90 kg/mol, determined by GPC according to ISO 16014-1, and 4.

Preferably, the XCS fraction has a molecular weight distribution MWD of 1.5 to 5.0, more preferably 2.0 to 4.0, most preferably 2.5 to 3.5.

In a preferred embodiment the XCS fraction is present in an amount of 5 to 40 wt %, more preferably 10 to 30 wt %, still more preferably 12 to 25 wt %, most preferably 15 to 22 wt % of the heterophasic polypropylene resin.

The inventive heterophasic polypropylene resin has a high melt flow rate. The melt flow rate mainly depends on the average molecular weight. This is due to the fact that long molecules render the material a lower flow tendency than short molecules. A decrease in molecular weight means an increase in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight.

The heterophasic polypropylene resin according to the invention has a melt flow rate MFR (2.16 kg, 230° C.) of more than 100 g/10 min, preferably 105 to 1000 g/10 min, most preferably 110 to 500 g/10 min, determined according to ISO 1133 thus indicating a high flowability of the polypropylene resin.

At the same time, the heterophasic polypropylene resin preferably has a Charpy notched impact strength at +23° C. of at least 5.0 kJ/m$^2$, more preferably at least 6.0 kJ/m$^2$, still more preferably at least 7.0 kJ/m$^2$, and most preferably at least 8.0 kJ/m$^2$. Further, the heterophasic polypropylene resin preferably has a Charpy notched impact strength at +0° C. of at least 4.0 kJ/m$^2$, more preferably at least 5.0 kJ/m$^2$, still more preferably at least 6.0 kJ/m$^2$, and most preferably at least 6.5 kJ/m$^2$, and preferably has a Charpy notched impact strength at −20° C. of at least 3.0 kJ/m$^2$, more preferably at least 4.0 kJ/m$^2$, still more preferably at least 5.0 kJ/m$^2$, and most preferably at least 5.5 kJ/m$^2$.

Still further, the resin preferably has an instrumented falling weight impact at +23° C. of at least 11 J, more preferably of at least 12 J, still more preferably of at least 13 J, most preferably of at least 14 J, and at −20° C. of at least 2.5 J, more preferably at least 3.0 J, most preferably at least 3.4 J, determined according to ISO 6603-2.

The preferred high values for Charpy notched impact strength and instrumented falling weight impact indicate excellent impact properties of the polypropylene resin even at low temperatures.

In addition, it is preferred that the polypropylene resin has a melting temperature $T_c$ of higher than 125° C., more preferably higher than 140° C., most preferably higher than 150° C., as determined by differential scanning calorimetry (DSC).

Further, it is preferred that the polypropylene resin has a crystallisation temperature $T_c$ of 110 to 122° C., preferably of 113 to 121° C., most preferably of 115 to 120° C., as determined by DSC.

It is also preferred that the glass transition temperature of the XCU fraction is in the range of −5 and +5° C. and that the glass transition temperature of the XCS fraction is in the range of −55 to −40° C., both values being determined by dynamic-mechanical thermal analysis (DMTA).

In a preferred embodiment the heterophasic polypropylene resin has been produced in a multi-stage process. Multistage processes include also bulk/gas phase reactors known as multizone gas phase reactors.

A preferred multistage process is a "loop-gas phase"-process, such as developed by Borealis A/S, Denmark (known as BORSTAR® technology) described e.g. in patent literature, such as in EP 0 887 379 or in WO 92/12182.

The heterophasic polypropylene resin according to this invention is produced preferably in a multi-stage process in a multi-stage reaction sequence. Thereby it is preferred that the propylene homo- or copolymer matrix (A) is produced in the bulk reactor and afterwards transferred to the gas phase reactor in which the ethylene-propylene rubber phase (B) is produced in the presence of component (A).

The bulk polymerisations are preferably performed in a so-called loop reactor.

Optionally, the process may also comprise a pre-polymerisation step in a manner known in the field and which may precede the first polymerisation step (a).

The process is preferably a continuous process.

Preferably, in the process for producing the propylene polymer as defined above the conditions for the bulk reactor of step (a) may be as follows:
- the temperature is within the range of 40° C. to 110° C., preferably between 60° C. and 100° C., most preferably 70 to 90° C.,
- the pressure is within the range of 20 bar to 80 bar, preferably between 30 bar to 60 bar,
- hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:
- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

In a further embodiment, the components (A) and (B) are preferably polymerized separately and compounded by melt-mixing.

The polypropylene resin according to this invention is obtainable by a catalyst system comprising an asymmetric catalyst, whereby the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is below detection limit when determined with the method applied according to DIN 66135.

An asymmetric catalyst according to this invention is a catalyst comprising at least two organic ligands which differ in their chemical structure.

Furthermore it is preferred, that the catalyst system has a surface area of less than 25 m$^2$/g, yet more preferred less than 20 m$^2$/g, still more preferred less than 15 m$^2$/g, yet still less than 10 m$^2$/g and most preferred less than 5 m$^2$/g. The surface area according to this invention is measured according to ISO 9277 ($N_2$).

It is in particular preferred that the catalytic system according to this invention comprises an asymmetric catalyst, i.e. a catalyst as defined below, and has porosity not detectable when applying the method according to DIN 66135 ($N_2$) and has a surface area measured according to ISO 9277 ($N_2$) less than 5 m$^2$/g.

Preferably, the asymmetric catalyst employed comprises an organo-metallic compound of a transition metal of group 3 to 10 or the periodic table (IUPAC) or of an actinide or lanthanide.

The asymmetric catalyst is more preferably of a transition metal compound of formula (I)

$$(L)_m R_n MX_q \quad (I)$$

wherein
M is a transition metal of group 3 to 10 or the periodic table (IUPAC), or of an actinide or lantanide,
each X is independently a monovalent anionic ligand, such as σ-ligand,
each L is independently an organic ligand which coordinates to M,
R is a bridging group linking two ligands L,
m is 2 or 3,
n is 0 or 1,
q is 1, 2 or 3,
m+q is equal to the valency of the metal, and
with the proviso that at least two ligands "L" are of different chemical structure.

Said asymmetric catalyst is preferably a single site catalyst (SSC).

In a more preferred definition, each "L" is independently (a) a substituted or unsubstituted cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC); or
(b) an acyclic, to $\eta^1$- or $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or
(c) a cyclic σ-, $\eta^1$- to $\eta^4$- or $\eta^6$, mono-, bi- or multidentate ligand composed of unsubstituted or substituted mono-, bi- or multicyclic ring systems selected from aromatic or non-aromatic or partially saturated ring systems and containing carbon ring atoms and optionally one or more heteroatoms selected from Groups 15 and 16 of the Periodic Table.

The term "σ-ligand" is understood in the whole description in a known manner, i.e. a group bonded to the metal at one or more places via a sigma bond. A preferred monovalent anionic ligand is halogen, in particular chlorine (Cl).

In a preferred embodiment, the asymmetric catalyst is preferably of a transition metal compound of formula (I)

$$(L)_m R_n MX_q \quad (I)$$

wherein
M is a transition metal of group 3 to 10 or the periodic table (IUPAC), or of an actinide or lantanide,
each X is independently a monovalent anionic ligand, such as σ-ligand,
each L is independently an organic ligand which coordinates to M, wherein the organic ligand is an unsaturated organic cyclic ligand, more preferably a substituted or unsubstituted, cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC),
R is a bridging group linking two ligands L,
m is 2 or 3,
n is 0 or 1,
q is 1, 2 or 3,
m+q is equal to the valency of the metal, and
with the proviso that at least two ligands "L" are of different chemical structure.

According to a preferred embodiment said asymmetric catalyst compound (I) is a group of compounds known as metallocenes. Said metallocenes bear at least one organic ligand, generally 1, 2 or 3, e.g. 1 or 2, which is η-bonded to the metal, e.g. a $\eta^{2-5}$-ligand, such as a $\eta^5$-ligand. Preferably, a metallocene is a Group 4 to 6 transition metal, more preferably zirconium, which contains at least one $\eta^5$-ligand.

Preferably the asymmetric catalyst compound has a formula (II):

$$(Cp)_m R_n MX_q \quad (II)$$

wherein
M is Zr, Hf or Ti, preferably Zr
each X is independently a monovalent anionic ligand, such as σ-ligand,
each Cp is independently an unsaturated organic cyclic ligand which coordinates to M,
R is a bridging group linking two ligands L,
m is 2,
n is 0 or 1, more preferably 1,
q is 1, 2 or 3, more preferably 2,
m+q is equal to the valency of the metal, and
at least one Cp-ligand, preferably both Cp-ligands, is(are) selected from the group consisting of unsubstituted cyclopenadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl,
with the proviso in case both Cp-ligands are selected from the above stated group that both Cp-ligands must chemically differ from each other.

Preferably, the asymmetric catalyst is of formula (II) indicated above, wherein
M is Zr
each X is Cl,
n is 1, and
q is 2.

Preferably both Cp-ligands have different residues to obtain an asymmetric structure.

Preferably, both Cp-ligands are selected from the group consisting of substituted cyclopentadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopentadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR″$_3$, —OSiR″$_3$, —SR″, —R″$_2$ and —NR″$_2$, wherein each R″ is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such are manner that both Cp-ligands are of different chemical structure, i.e both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substituents each and differ in the substituents bonded to the five membered ring of the idenyl rings.

Concerning the moiety "R" it is preferred that "R" has the formula (III)

$$—Y(R')_2—$$  (III)

wherein
Y is C, Si or Ge, and
R' is $C_1$ to $C_{20}$ alkyl, $C_6$-$C_{12}$ aryl, or $C_7$-$C_{12}$ arylalkyl.

In case both Cp-ligands of the asymmetric catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$-, —Si(phenyl)$_2$ or —Si($C_1$-$C_6$ alkyl)(phenyl)-, such as —Si(Me)$_2$-.

In a preferred embodiment the asymmetric catalyst is defined by the formula (IV)

$$(Cp)_2R_1ZrX_2$$  (IV)

wherein
each X is independently a monovalent anionic ligand, such as σ-ligand, in particular halogen
both Cp coordinate to M and are selected from the group consisting of unsubstituted cyclopentadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl,
with the proviso that both Cp-ligands must chemically differ from each other, and
R is a bridging group linking two ligands L,
wherein R is defined by the formula (III)

$$—Y(R')_2—$$  (III)

wherein
Y is C, Si or Ge, and
R' is $C_1$ to $C_{20}$ alkyl, $C_6$-$C_{12}$ aryl, or $C_7$-$C_{12}$ arylalkyl.

More preferably the asymmetric catalyst is defined by the formula (IV), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (IV), wherein both Cp are selected from the group consisting of substituted cyclopentadienyl, substituted indenyl, substituted tetrahydroindenyl, and substituted fluorenyl with the proviso that both Cp-ligands differ in the substituents, i.e. the substituents as defined above, bonded to cyclopentadienyl, indenyl, tetrahydroindenyl, or fluorenyl.

Still more preferably the asymmetric catalyst is defined by the formula (IV), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl [(2-methyl-(4'-tert.butyl)-4-phenyl-indenyl)(2-isopropyl-(4'-tert.butyl)-4-phenyl-indenyl)]zirconium dichloride. More preferred said asymmetric catalyst is not silica supported.

The above described asymmetric catalyst components are prepared according to the methods described in WO 01/48034.

It is in particular preferred that the asymmetric catalyst system is obtained by the emulsion solidification technology as described in WO 03/051934. This document is herewith included in its entirety by reference. Hence the asymmetric catalyst is preferably in the form of solid catalyst particles, obtainable by a process comprising the steps of
a) preparing a solution of one or more asymmetric catalyst components;
b) dispersing said solution in a solvent immiscible therewith to form an emulsion in which said one or more catalyst components are present in the droplets of the dispersed phase,
c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 µm, more preferably 10 to 100 µm.

Moreover, the form of solidified particles have preferably a spherical shape, a predetermined particles size distribution and a surface area as mentioned above of preferably less than 25 $m^2$/g, still more preferably less than 20 $m^2$/g, yet more preferably less than 15 $m^2$/g, yet still more preferably less than 10 $m^2$/g and most preferably less than 5 $m^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

As mentioned above the catalyst system may further comprise an activator as a cocatalyst, as described in WO 03/051934, which is enclosed herein with reference.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present invention is related to the use of the above-defined catalyst system for the production a heterophasic polypropylene resin according to this invention.

Still further, the present invention is related to a process for the production of the inventive heterophasic polypropylene resin wherein the propylene homo- or copolymer matrix phase (A) is prepared in a first stage, and the ethylene-propylene rubber phase (B) is prepared in a second stage in presence of the first stage product.

Additionally, the present invention is related to a heterophasic polypropylene composition comprising the inventive heterophasic polypropylene resin and modifiers in an amount of up to 10 wt % as well as additives in an amount up to 1 wt %. These modifiers and/or additives may be included during the polymerisation process or after the polymerisation by melt mixing. Suitable modifiers include other thermoplastics like polyethylene homo- or copolymers, poly-1-butene, poly-4-methylpentene-1 and/or thermoplastic elastomers like ethylene-propylene rubber or styrene elastomers as well as mineral fillers like talc or calcium carbonate. Suitable additives include stabilizers, lubricants, nucleating agents, pigments and foaming agents.

Further, the present invention relates to articles comprising the heterophasic polypropylene resin or the heterophasic polypropylene composition according to the invention produced by any common conversion process suitable for thermoplastic polymers like injection moulding, extrusion blow moulding, injection stretch blow moulding or cast film extrusion.

Still further, the present invention relates to the use of the heterophasic polypropylene resin according to the invention for producing such an article.

In the following, the present invention is described by way of examples.

EXAMPLES

1. Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

b) Xylene Soluble Fraction

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter). The fraction insoluble in p-xylene at 25° C. (XCU) is then equal to 100%-XCS %.

c) Intrinsic Viscosity

The intrinsic viscosity (IV) value increases with the molecular weight of a polymer. The intrinsic viscosity of the XCU and the XCS fraction is measured in decalin at 135° C. according to DIN EN ISO 1628-1 and -3.

d) Weight Average Molecular Weight and MWD

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 ml/min. 216.5 µl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 ml (at 160° C.) of stabilized TCB (same as mobile phase) and keeping for 3 hours with continuous shaking prior sampling in into the GPC instrument.

In case of PP the constants are: K: $19 \times 10^{-3}$ ml/g and a: 0.725 for PP e) $^{13}$C NMR Measurement The $^{13}$C NMR measurements are performed with Varian Gemini 2000 300 MHz spectrometer operating at 125° C. The material is dissolved with a mixture of 1,2,4 trichlorobenzene and benzene in a weight ratio of 80/20. the acquisition time is 2 s, the acquisition delay is 8 s.

From the spectra the triad and dyad distributions and the ethylene content are calculated. Further, the assignment of the peaks is performed according to Randall, J. C., A Review of High Resolution Liquid $^{13}$Carbon Nuclear Magnetic Resonance Characterization of Ethylene-Based Polymers, *Macromol Chem Phys* C29 (1989) 201-317.

f) Melting and Crystallisation Temperature

The melting and crystallisation temperature $T_m$ and $T_c$ are determined according to ISO 11357-1, -2 and -3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature $T_c$ being determined in the cooling step and the $T_m$ melting temperature being determined in the second heating step.

g) Glass Transition Temperature

The glass transition temperature $T_g$ is determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

h) Charpy Notched Impact Strength

Charpy impact strength was determined according to ISO 179-1eA:2000 on V-notched samples of 80×10×4 $mm^3$ at 23° C. (Charpy impact strength (23° C.)), 0° C. (Charpy impact strength (0° C.)) and −20° C. (Charpy impact strength (−20° C.)). When not otherwise stated a standard impact velocity of 2.9 m/s was used. Some of the examples were tested with a different impact velocity of 1.5 m/s.

The test specimens were prepared by injection moulding using an IM V 60 TECH machinery in line with ISO 1872-2. The melt temperature was 200° C. and the mold temperature was 40° C.

i) Instrumented Falling Weight Impact

The instrumented falling weight impact is determined according to ISO 6603-2 with a velocity of 4.4 m/s on 60×60×2 $mm^3$ plates at +23° C. and −20° C.

j) Tensile Modulus

Tensile strength properties were determined according to ISO 527-2. Compression moulded specimens of type 1A were used, which were prepared according to ISO 1872-2.

Tensile modulus (in MPa) was determined according to ISO 527-2. The measurement was conducted at 23° C. temperature with an elongation rate of 1 mm/min.

2. Compositions

Inventive Examples

Catalyst

A support-free catalyst (III) has been prepared as described in example 5 of WO 03/051934 whilst using an asymmetric metallocene dimethylsilyl [(2-methyl-(4'-tert.butyl)-4-phenyl-indenyl)(2-isopropyl-(4'-tert.butyl)-4-phenyl-indenyl)] zirconium dichloride.

Polymerisation:

The inventive examples were prepared in a 2 l bench scale reactor initially filled with $N_2$ at 1 bar gauge. Catalyst, minor amount of triethylaluminum and hydrogen were first added in the reactor. Further on liquid propylene was fed and a prepolymerization was carried out at 20° C. for 6 min. Stirring was started and the temperature was increased to a set point temperature of 70° C., cf. data table 1. At these conditions the polymerization of the matrix component was carried out. In a subsequent step in the same vessel in the presence of the matrix particles with still active catalyst a gas phase polymerization was conducted to form the ethylene-propylene disperse phase. The operating temperature in the gas phase was 85° C., cf. data table 1. This high temperature and the fact that ethylene is acting as a chain transfer agent led to a drop in the intrinsic viscosity of the produced XCS fraction. Therefore, the hydrogen feed could be stopped to achieve a constant intrinsic viscosity of the XCS fraction of about 2.0 dl/g. At the end of the polymerisation, the reactor was vented.

After the polymerisation process the materials were pelletized in the presence of standard antioxidants and process stabilizers. The pelletization was done on a twin screw extruder with the following temperature profile: Zone 1; Zone 2; Zone 3; Zone 4; Zone 5; of 210° C.; 215° C.; 220° C.; 215° C.; 210° C. accordingly. The screw speed was set to 250 rpm and the throughput to 3 kg/h.

The polymer was dried in an oven, assisted by a flow of warm nitrogen, and samples were analyzed. The results are summarized in Table 2.

TABLE 1

Polymerisation parameters

|  | Example 1 (Ex1) | Example 2 (Ex2) | Example 3 (Ex3) |
|---|---|---|---|
| Bulk Reactor: |  |  |  |
| Temperature [° C.] | 70.0 | 70.0 | 70.0 |
| $H_2$ amount [bar] | 1.2 | 1.5 | 2.0 |
| Gas Phase Reactor: |  |  |  |
| Temperature [° C.] | 85.0 | 85.0 | 85.0 |
| $H_2$ amount [bar] | 0 | 0 | 0 |
| C2/C3 [wt %/wt %] | 50/50 | 50/50 | 50/50 |

As Comparative Example (CE1) the heterophasic propylene copolymer BJ356M0, distributed by Borealis Polyolefine GmbH, is used.

The XCU and the XCS fraction of the Examples Ex1, Ex2 and Ex3 and CE1 have the following properties as listed in table 2:

TABLE 2

Analytical characterisation

|  | Ex1 | Ex2 | Ex3 | CE1 |
|---|---|---|---|---|
| Amount XCU [wt %] | 83.1 | 81.8 | 79.4 | 86.0 |
| IV (XCU) [dl/g] | 0.9 | 0.8 | 0.7 | 1.2 |
| $M_w$ (XCU) [kg/mol] | 132.7 | 119.5 | 90.0 | 238.0 |
| $M_n$ (XCU) [kg/mol] | 49.0 | 42.4 | 37.5 | 43.3 |
| MWD (XCU) | 2.8 | 2.9 | 2.4 | 5.5 |
| Amount XCS [wt %] | 16.9 | 18.2 | 20.6 | 14.0 |
| C2 (XCS) [wt %] | 30.3 | 28.6 | 34.4 | 53.0 |
| C3 (XCS) [mol %] | 60.5 | 62.5 | 66.0 | 37.2 |
| IV (XCS) [dl/g] | 1.9 | 2.0 | 2.0 | 2.0 |
| $M_w$ (XCS) [kg/mol] | 225 | 250 | 245 | 220 |
| $M_n$ (XCS) [kg/mol] | 75 | 78 | 80 | 35 |
| MWD (XCS) | 3.0 | 3.2 | 3.1 | 6.3 |

The Triad and dyad distributions calculated from NMR spectra of Example 2 (Ex2) listed in Table 3 and 4 show for the XCU fraction in Table 3 98.6 mol % of propylene homopolymer whereas the ethylene comonomer units are distributed statistically. For the XCS fraction, Table 4 shows a high degree of statistical distribution of ethylene and propylene monomer units and only small amounts of propylene and ethylene clusters.

TABLE 3

Triad and dyad distributions and ethylene content
of XCU fraction of Ex2 calculated from NMR spectra

|  | Amount [mol %] | Ethylene content [mol %] |
|---|---|---|
| Triads |  | 0.6 |
| PPP | 98.6 |  |
| PPE + EPP | 0.7 |  |
| PEP | 0.1 |  |
| PEE + EEP | 0.3 |  |
| EPE | 0.0 |  |
| EEE | 0.2 |  |

TABLE 3-continued

Triad and dyad distributions and ethylene content
of XCU fraction of Ex2 calculated from NMR spectra

|  | Amount [mol %] | Ethylene content [mol %] |
|---|---|---|
| Dyads: |  | 0.8 |
| PP | 98.8 |  |
| PE + EP | 0.9 |  |
| EE | 0.3 |  |

TABLE 4

Triad and dyad distributions and ethylene content
of XCS fraction of Ex2 calculated from NMR spectra

|  | Amount [mol %] | Ethylene content [mol %] |
|---|---|---|
| Triads: |  | 43.5 |
| PPP | 21.0 |  |
| PPE + EPP | 26.7 |  |
| PEP | 11.5 |  |
| PEE + EEP | 20.0 |  |
| EPE | 8.8 |  |
| EEE | 12.1 |  |
| Dyads: |  | 43.5 |
| PP | 34.8 |  |
| PE + EP | 43.3 |  |
| EE | 21.9 |  |

The properties of the inventive examples and the comparative example are compared in Table 5. It can be seen that the inventive examples show clear advantages both in flow and low temperature impact.

TABLE 5

Properties of inventive Examples Ex1, Ex2 and
Ex3 in comparison to Comparative Example CE1

|  | Ex1 | Ex2 | Ex3 | CE1 |
|---|---|---|---|---|
| MFR [g/10 min] | 110 | 147 | 251 | 100 |
| $T_m$ [° C.] | 157 | 158 | 157 | 164 |
| $T_c$ [° C.] | 119 | 118 | 116 | 124 |
| $T_g$ (XCU) [° C.] | 0 | 0 | 0 | +2 |
| $T_g$ (XCS) [° C.] | −46 | −44 | −42 | −50 |
| Charpy NIS, +23° C. [kJ/m$^2$] | 9.6* | 11.0* | 10.1 | 4.5 |
| Charpy NIS, 0° C. [kJ/m$^2$] | 7.4* | 7.9* | n.m. | n.m. |
| Charpy NIS, −20° C. [kJ/m$^2$] | 6.3* | 7.7* | 6.3 | 2.5 |
| IFWI, +23° C. [J] | 14.0 | 17.8 | n.m. | 10.0 |
| IFWI, −20° C. [J] | 3.4 | 9.9 | n.m. | 10.0 |
| Tensile Modulus [MPa] | 990 | 920 | 864 | 1600 |

*Impact velocity 1.5 m/s
n.m. not measured

The invention claimed is:

1. Heterophasic polypropylene resin comprising
a propylene homo- or copolymer matrix (A) and an ethylene propylene rubber phase (B) dispersed within the matrix,
wherein the heterophasic polypropylene resin has
a fraction insoluble in p-xylene at 25° C. (XCU) with an intrinsic viscosity of 1.5 dl/g or less, determined according to DIN EN ISO 1628-1 and -3 and an amount of propylene monomer units of at least 95 mol %, and
a fraction soluble in p-xylene at 25° C. (XCS) with an intrinsic viscosity of 1.5 to 3.0 dl/g, determined according to DIN EN ISO 1628-1 and -3, and an amount of propylene monomer units of 50 to 75 mol %, and a molecular weight distribution MWD of 2.5 to 3.5, and a MFR (2.16 kg, 230° C.) of more than 100 g/10 min, determined according to ISO 1133,
wherein the XCU fraction is present in an amount of 70 to 90 wt % of the heterophasic polypropylene resin and the XCS fraction is present in an amount of 10 to 30 wt % of the heterophasic polypropylene resin.

2. Heterophasic polypropylene resin according to claim 1 wherein the XCU fraction has a weight average molecular weight Mw of 50 to 200 kg/mol, measured by GPC according to ISO 16014-1, and 4.

3. Heterophasic polypropylene resin according to claim 1 wherein the XCU fraction has a molecular weight distribution MWD of 1.5 to 5.0.

4. Heterophasic polypropylene resin according to claim 1 wherein the XCS fraction has a weight average molecular weight Mw of 80 to 300 kg/mol measured by GPC according to ISO 16014-1, and 4.

5. Heterophasic polypropylene resin according to claim 1 wherein the resin has a Charpy notched impact strength at +23° C. of at least 5.0 kJ/m$^2$, determined according to ISO 179-1/1 eA.

6. Heterophasic polypropylene resin according to claim 1 wherein the resin has a Charpy notched impact strength at 0° C. of at least 4.0 kJ/m$^2$, determined according to ISO 179-1/1 eA.

7. Heterophasic polypropylene resin according to claim 1 wherein the resin has a Charpy notched impact strength at −20° C. of at least 3.0 kJ/m$^2$, determined according to ISO 179-1/1 eA.

8. Heterophasic polypropylene resin according to claim 1 wherein the resin has an instrumented falling weight impact at +23° C. of at least 11 J, determined according to ISO 6603-2.

9. Heterophasic polypropylene resin according to claim 1 wherein the resin has been produced in a multistage process.

10. Heterophasic polypropylene resin according to claim 1 wherein the resin has been produced in presence of a catalyst System comprising an asymmetric catalyst wherein the catalyst System has a porosity of less than 1.40 ml/g.

11. Heterophasic polypropylene resin according to claim 10 wherein the asymmetric catalyst is dimethylsilyl [(2-methyl-(4'-tert.butyl)-4-phenyl-indenyl) (2-isopropyl-(4'-tert.butyl)-4-phenyl-indenyl)]-zirconium dichloride.

12. Process for the production of a heterophasic polypropylene resin according to claim 1 wherein the propylene homo- or copolymer matrix phase (A) is prepared in a first stage, and the ethylene-propylene rubber phase (B) is prepared in a second stage in presence of the first stage product.

13. Heterophasic polypropylene composition comprising a heterophasic polypropylene resin according to claim 1 and modifiers in an amount of up to 10 wt % as well as additives of up to 1 wt %.

14. Article comprising the heterophasic polypropylene resin according to claim 1 or the heterophasic polypropylene composition according to claim 13.

15. Article comprising the heterophasic polypropylene composition according to claim 13.

\* \* \* \* \*